3/14/78 OR 4,078,851

United States Patent [19]
Albanese

[11] 4,078,851
[45] Mar. 14, 1978

[54] ELECTROSTATIC OPTICAL FIBER HOLDER

[75] Inventor: Andres Albanese, Matawan, N.J.

[73] Assignee: Bell Telephone Laboratories, Incorporated, Murray Hill, N.J.

[21] Appl. No.: 770,904

[22] Filed: Feb. 22, 1977

[51] Int. Cl.$^2$ .............................................. G02B 5/14
[52] U.S. Cl. .................... 350/96.10; 350/96.20; 361/234
[58] Field of Search .......................... 350/96 C, 96 R; 361/234

[56] References Cited
U.S. PATENT DOCUMENTS
3,916,270  10/1975  Wachtler et al. ................... 361/234

OTHER PUBLICATIONS

"The Electroforce Chuck" Brochure from Electroforce Associated, 75 N. Pinecreek Rd., Fairfield, Conn.

Benson, W. W., "Optical Fiber Vacuum Chuck" Applied Optics, Apr. 1975, pp. 816–817.

C. M. Miller, "Loose Tube Splices for Optical Fibers" The Bell System Technical Journal, Sep. 1975, pp. 1215–1225.

R. W. Callahan, "Electrostatic Light Switch" IBM Tech. Disclosure Bull., vol. 12, No. 6, Nov. 1969, p. 854.

Primary Examiner—John K. Corbin
Assistant Examiner—Rolf Hille
Attorney, Agent, or Firm—A. A. Tirva

[57] ABSTRACT

An electrostatic optical fiber holder includes two electrodes spaced apart and forming two alignment surfaces. A voltage applied between the two electrodes produces a nonuniform electric field which exerts an electrostatic force upon an optical fiber placed in the field, such that the fiber is positioned and held in contact with the two alignment surfaces.

8 Claims, 2 Drawing Figures

ELECTROSTATIC OPTICAL FIBER HOLDER

BACKGROUND OF THE INVENTION

This invention relates to optical fiber communication systems and particularly to an electrostatic optical fiber holder used to hold and align optical fibers.

Although optical fibers have been successfully used as communications transmission media, the splicing of optical fibers was and continues to be a difficult task. Unlike the splicing of wires which are relatively easy to handle and require only good electrical contact between them, the splicing of optical fibers is difficult because optical fibers are very delicate and require careful handling. Furthermore, the optical fibers to be coupled together require a substantially perfect axial alignment between them to obtain the required coupling efficiency, because any axial misalignment will attenuate the signal across the coupling.

A prior art optical fiber holding and alignment device utilizes a vacuum to position and hold optical fibers in an alignment groove. While such a device does provide the required alignment accuracy, it is not readily portable because of the vacuum requirement and furthermore, if a permanent splice is to be made between the two fibers, the adhesive used to join the fibers has a tendency to get into the vacuum system impairing its operation. Ideally, an optical fiber holding and alignment device should be inexpensive and should be readily portable so that it could be used in the field as well as in the lab.

Therefore, it is an object of the invention to provide another optical fiber holder.

Another object of the invention is to provide a relatively low-cost optical fiber holder.

Yet another object of the invention is to provide an optical fiber holder which is readily portable.

These and other objects of the invention are realized in one illustrative embodiment thereof wherein the holder has two electrodes which are spaced apart and form two alignment surfaces, and a voltage is applied between the two electrodes to produce a nonuniform electric field which exerts an electrostatic force upon an optical fiber placed in the field, so that the fiber is positioned and held in contact with the two alignment surfaces.

A feature of the invention is that an electrostatic force exerted by a nonuniform electric field is used to position and hold an optical fiber against two alignment surfaces.

Another feature of the invention is that the two electrodes form two alignment surfaces for the optical fiber.

Yet another feature of the invention is that the voltage applied to the electrodes is produced by a piezoelectric device.

BRIEF DESCRIPTION OF THE DRAWING

A better understanding of the invention may be derived from the detailed description following as that description is used with respect to the attached drawing in which.

DETAILED DESCRIPTION

Figure 1:
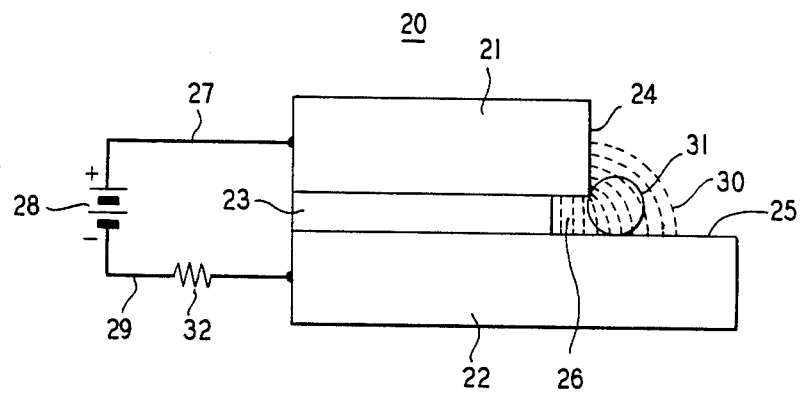
FIG. 1 is a side view of the electrostatic fiber holder embodying the present invention.

In the embodiment of the invention illustrated in FIG. 1, an electrostatic fiber holder 20 comprises electrodes 21 and 22 separated by an insulator 23. The electrodes 21 and 22 are made of brass and the insulator 23 is made of an acetate material. Electrodes 21 and 22 have alignment surfaces 24 and 25, respectively. The two alignment surfaces 24 and 25 form a groove 26 which is the width of the acetate insulator 23. Electrode 21 is connected via a conductor 27 to the positive side of a potential source 28, while electrode 22 is connected via conductor 29 to the negative side of the potential source 28. Application of a potential between electrodes 21 and 22 produces a nonuniform electric field 30. The field 30 has its strongest region in the area where the two electrodes 21 and 22 are closest to each other.

An optical fiber 31 placed in the nonuniform electric field 30 comes under the influence of an electrostatic force exerted by the nonuniform electric field 30. The force urges the fiber 31 into the groove 26 and into contact with the alignment surfaces 24 and 25. The maximum electrostatic force acting upon the fiber 31 is dependent upon the potential between the electrodes 21 and 22. To prevent damage to the fiber 31 caused by arcing between the electrodes 21 and 22, the potential between the electrodes 21 and 22 is set below the air breakdown voltage. This voltage, of course, varies with the thickness of the insulator between the two electrodes.

For an optical fiber having a diameter of 250 micrometers, the insulator 23 is made at least 125 micrometers thick. The air break-down voltage for a gap of 125 micrometers has been experimentally determined to be 600 volts. It has also been experimentally determined that when a potential of 400 volts is applied between the electrodes 21 and 22, the electrostatic force developed by the nonuniform electric field 30 is ten times the force needed to hold the fiber with a diameter of 250 micrometers.

A ten megohm resistor 32 is added in series with the potential source 28 to limit the current through the source in the event someone should come into contact with two electrodes 21 and 22.

Figure 2:
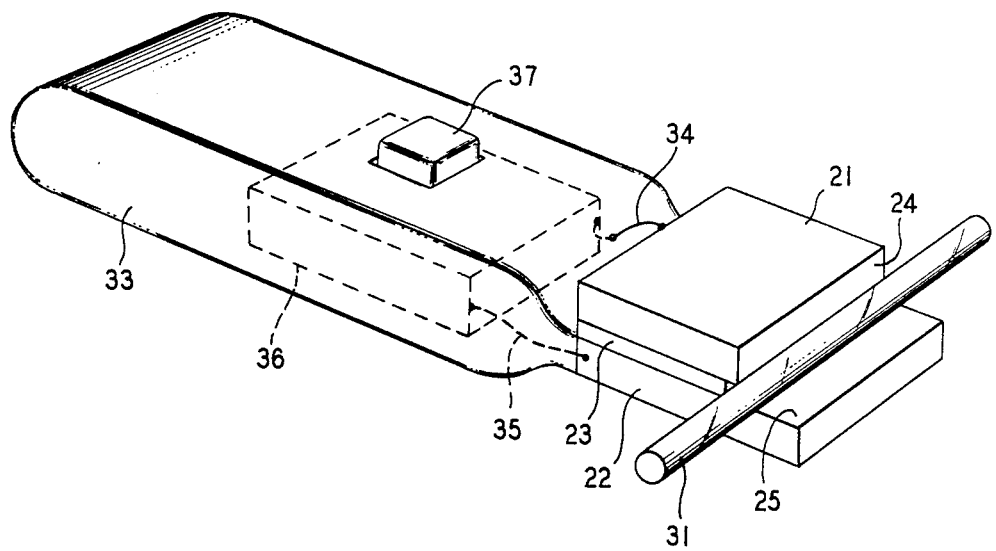
FIG. 2 is a perspective view of an alternative embodiment of the present invention.

In FIG. 2, there is illustrated an alternative embodiment of the invention wherein the electrostatic fiber holder 20, shown in FIG. 1, is attached to a handle 33. Electrodes 21 and 22 are connected via conductors 34 and 35 to a piezoelectric device 36 which is located within the handle 33. The handle 33 has a button 37 which when depressed deforms a piezoelectric ceramic within the piezoelectric device 36 producing a voltage which in some cases may be as high as 1000 volts. The piezoelectric device 36 is a commercially available item usually marketed as a gas lighter.

What is claimed is:

1. An electrostatic optical fiber holder comprising:
   first and second electrodes spaced apart and forming two alignment surfaces, and
   means for producing a nonuniform electric field between the two electrodes, the field exerting an electrostatic force upon an optical fiber placed in the field such that the fiber is urged into contact with the two alignment surfaces.

2. The holder of claim 1, wherein the means for producing the nonuniform electric field includes a voltage source.

3. The holder of claim 2, wherein the voltage source comprises a piezoelectric transducer.

4. The holder of claim 1, wherein the two electrodes are spaced apart by an insulator.

5. The holder of claim 4, wherein the two electrodes are made of brass.

6. The holder of claim 5, wherein the thickness of the insulator is at least half the thickness of an optical fiber to be held by the holder.

7. The holder of claim 6, wherein the insulator is made of an acetate material.

8. An electrostatic optical fiber holder comprising:
first and second electrodes separated by an insulator, the two electrodes forming two alignment surfaces,
means for producing a nonuniform electric field between the two electrodes, and
at least one optical fiber disposed within the electric field, the fiber being urged into contact with the two alignment surfaces by an electrostatic force exerted by the nonuniform electric field.

* * * * *